United States Patent
Drake

(10) Patent No.: US 11,700,139 B2
(45) Date of Patent: Jul. 11, 2023

(54) VIRTUAL MICROPHONE INPUT FOR MULTIPLE VOICE ASSISTANTS

(71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 201 days.

(21) Appl. No.: 17/097,123

(22) Filed: Nov. 13, 2020

(65) Prior Publication Data

US 2022/0158862 A1    May 19, 2022

(51) Int. Cl.
G10L 15/22    (2006.01)
H04L 12/28    (2006.01)
G06F 3/16    (2006.01)

(52) U.S. Cl.
CPC .......... *H04L 12/2816* (2013.01); *G06F 3/167* (2013.01); *G10L 15/22* (2013.01); *G10L 2015/223* (2013.01); *H04L 2012/285* (2013.01)

(58) Field of Classification Search
CPC ........... H04L 12/2816; H04L 2012/285; H04L 12/282; G06F 3/167; G10L 15/22; G10L 2015/223; G10L 15/28
See application file for complete search history.

(56) References Cited

U.S. PATENT DOCUMENTS

| | | | |
|---|---|---|---|
| 10,681,460 B2 * | 6/2020 | Woo | G10L 15/22 |
| 2013/0325484 A1 * | 12/2013 | Chakladar | G10L 15/22 704/275 |
| 2019/0013019 A1 * | 1/2019 | Lawrence | G10L 15/30 |
| 2019/0295547 A1 | 9/2019 | Gandhi | |
| 2019/0347063 A1 * | 11/2019 | Liu | G06F 3/167 |
| 2021/0304765 A1 * | 9/2021 | Wood | H04L 67/1014 |
| 2022/0013122 A1 * | 1/2022 | Nadkar | G10L 15/22 |
| 2022/0180867 A1 * | 6/2022 | Bobbili | G10L 15/22 |

FOREIGN PATENT DOCUMENTS

| | | | |
|---|---|---|---|
| CN | 110032354 A | * | 7/2019 |
| WO | WO2017222503 A1 | | 12/2017 |
| WO | WO2019227370 A1 | | 12/2019 |

\* cited by examiner

*Primary Examiner* — Abul K Azad
(74) *Attorney, Agent, or Firm* — Dority & Manning, P.A.

(57) ABSTRACT

A method of operating a voice assistant activation system, the voice assistant activation system comprising a microphone, a first voice assistant module, and a second voice assistant module. The method includes receiving, via the microphone, a voice input; transmitting the voice input via a first virtual microphone to the first voice assistant module; transmitting the voice input via a second virtual microphone to the second voice assistant module; activating the first voice assistant module when the voice input comprises a first keyword; and activating the second voice assistant module when the voice input comprises a second keyword.

17 Claims, 4 Drawing Sheets

VIRTUAL MICROPHONE INPUT FOR MULTIPLE VOICE ASSISTANTS

FIELD OF THE INVENTION

The present subject matter relates generally to network connected kitchen hubs, and more particularly to voice assistant modules incorporated in kitchen hubs.

BACKGROUND OF THE INVENTION

Generally, kitchen appliances are appliances (e.g., refrigerators, ovens, microwaves, etc.) that perform associated operations. Recently, kitchen appliances have become more interconnected with networks, both internally with each other and externally with the Internet. Some features that may be available on kitchen appliances are voice activated assistant features. In detail, a user may awaken a voice assistant module via a particular key word. The voice assistant module may then receive a voice request or command from the user and execute the request or command.

However, in order to be attentive to receive a key word, the voice assistant module must always have access to the microphone. Accordingly, for certain appliances containing only one microphone, only one voice assistant module may have access to the microphone at a time. Thus, if a user wanted to incorporate more than one voice assistant module into an appliance, additional microphones would need to be installed for each voice assistant module.

Accordingly, a kitchen hub or kitchen appliance including features that obviate one or more of these drawbacks would be beneficial. More specifically, a method of transmitting a single microphone input to multiple modules would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a voice assistant activation system is provided. The voice assistant activation system may include a microphone, a first voice assistant module, and a second voice assistant module. The method may include receiving, via the microphone, a voice input, transmitting the voice input via a first virtual microphone to the first voice assistant module, transmitting the voice input via a second virtual microphone to the second voice assistant module, activating the first voice assistant module when the voice input comprises a first keyword, and activating the second voice assistant module when the voice input comprises a second keyword.

In another exemplary aspect of the present disclosure, a computing system is disclosed. The computing system may include at least one processor, a microphone in communication with the at least one processor, a first voice assistant module connected to the at least one processor, a second voice assistant module connected to the at least one processor, and at least one tangible, non-transitory computer-readable medium that stores instructions that, when executed by the at least one processor, cause the at least one processor to perform operations. The operations may include receiving, via the microphone, a voice input, transmitting the voice input via a first virtual microphone to the first voice assistant module, transmitting the voice input via a second virtual microphone to the second voice assistant module, activating the first voice assistant module when the voice input comprises a first keyword, and activating the second voice assistant module when the voice input comprises a second keyword.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
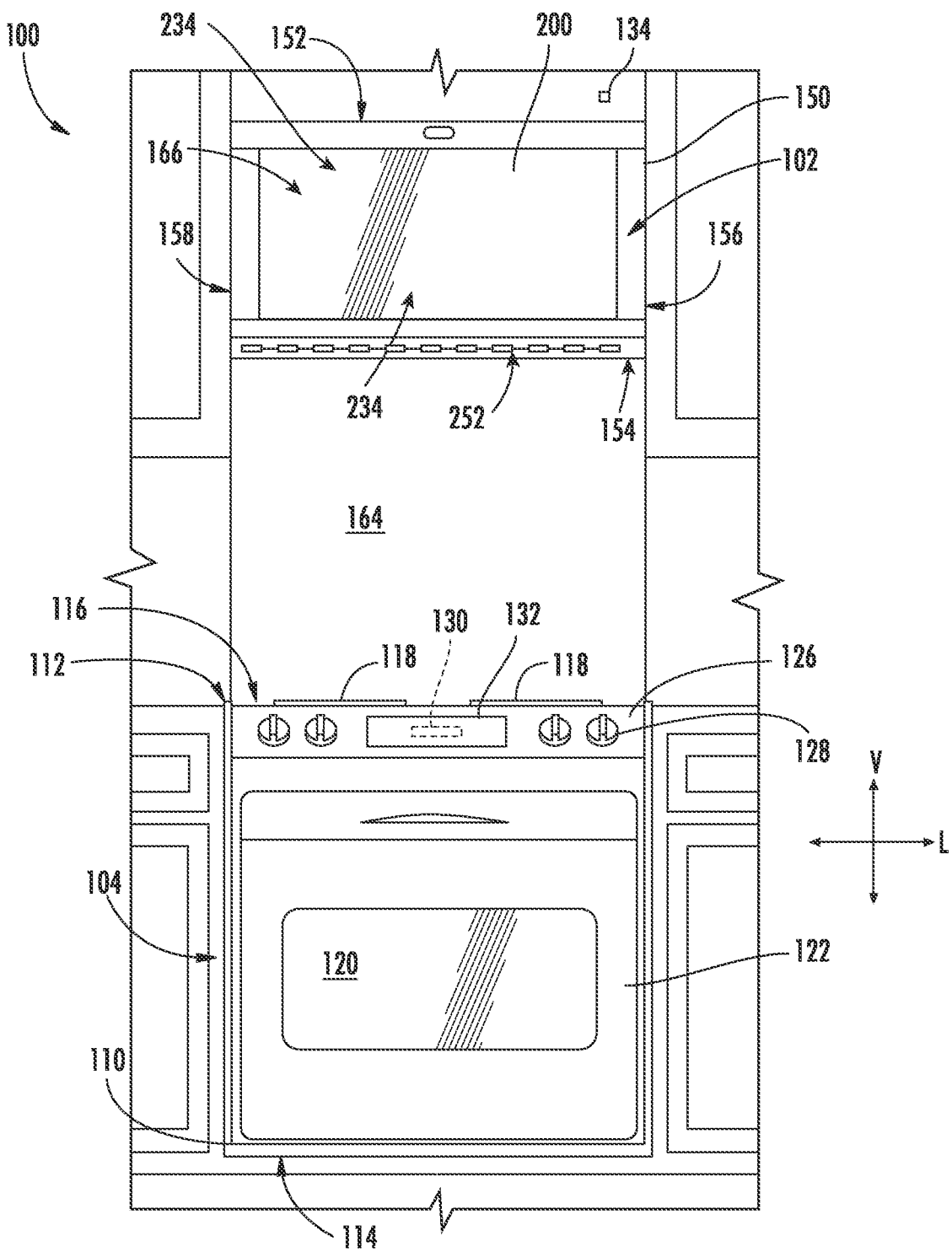
FIG. 1 provides a front view of a system, including a microwave appliance, according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
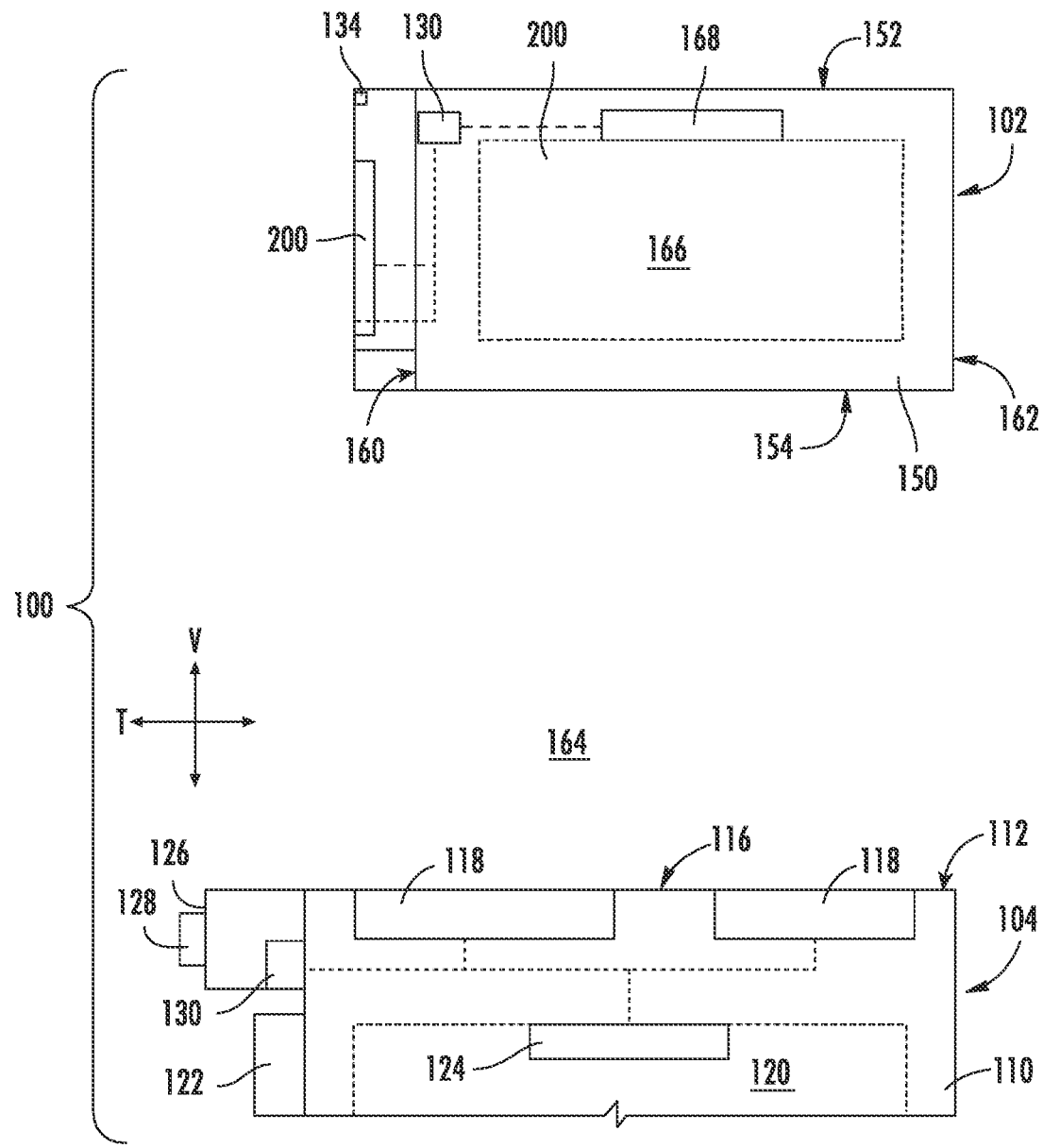
FIG. 2 provides a side schematic view of the exemplary system of FIG. 1.

Turning to the figures, FIGS. 1 and 2 provide various views of a system 100 according to exemplary embodiments of the present disclosure. System 100 may be a kitchen hub, including an over-the-range (OTR) microwave appliance 102 that can be positioned or mounted above a cooktop appliance 104. Each of these appliances 102, 104 within system 100 will be described independently and collectively below. However, it should be appreciated that the present subject matter is not limited to the specific appliances disclosed, and the specific appliance configurations are not intended to limit the scope of the present subject matter in any manner.

As shown in FIGS. 1 and 2, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and cooktop appliance 104 and will thus be used interchangeably to describe both appliances and their positions relative to each other.

Cooktop appliance 104 can include a chassis or cabinet 110 that extends along the vertical direction V between a top portion 112 and a bottom portion 114; along the lateral direction L between a left side portion and a right side portion; and along the traverse direction T between a front portion and a rear portion. Cooktop appliance 104 includes a cooktop surface 116 having one or more heating elements 118 for use in, for example, heating or cooking operations. In exemplary embodiments, cooktop surface 116 is constructed with ceramic glass. In other embodiments, however, cooktop surface 116 may include of another suitable material, such as a metallic material (e.g., steel) or another suitable non-metallic material. Heating elements 118 may be various sizes and may employ any suitable method for heating or cooking an object, such as a cooking utensil (not shown), and its contents. In some embodiments, for example, heating element 118 uses a heat transfer method, such as electric coils or gas burners, to heat the cooking utensil. In other embodiments, however, heating element 118 uses an induction heating method to heat the cooking utensil directly. In turn, heating element 118 may include a gas burner element, resistive heat element, radiant heat element, induction element, or another suitable heating element.

In some embodiments, cooktop appliance 104 includes an insulated cabinet 110 that defines a cooking chamber 120 selectively covered by a door 122. One or more heating elements 124 (e.g., top broiling elements or bottom baking elements) may be enclosed within cabinet 110 to heat cooking chamber 120. Heating elements 124 within cooking chamber 120 may be provided as any suitable element for cooking the contents of cooking chamber 120, such as an electric resistive heating element, a gas burner, a microwave element, a halogen element, etc. Thus, cooktop appliance 104 may be referred to as an oven range appliance. As will be understood by those skilled in the art, cooktop appliance 104 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 126 may be provided on cooktop appliance 104. Although shown at front portion of cooktop appliance 104, another suitable location or structure (e.g., a backsplash) for supporting user interface panel 126 may be provided in alternative embodiments. In some embodiments, user interface panel 126 includes input components or controls 128, such as one or more of a variety of electrical, mechanical, or electro-mechanical input devices. Controls 128 may include, for example, rotary dials, knobs, push buttons, and touch pads. A controller 130 is in communication with user interface panel 126 and controls 128 through which a user may select various operational features and modes and monitor progress of cooktop appliance 104. In additional or alternative embodiments, user interface panel 126 includes a display component 132, such as a digital or analog display in communication with a controller 130 and configured to provide operational feedback to a user. In certain embodiments, user interface panel 126 represents a general purpose I/O ("GPIO") device or functional block.

System 100 may include a microphone 134. Microphone 134 may be used for monitoring the sound waves, noises, or other vibrations generated by a user near system 100. For example, microphone 134 may be one or more microphones, acoustic detection devices, vibration sensors, or any other suitable acoustic transducers that are positioned at one or more locations in or around system 100. For example, according to exemplary embodiments, microphone 134 may be mounted within microwave appliance 102 or cooktop appliance 104 for detecting any sounds within audible range of system 100. In addition, or alternatively, microphone 134 may be positioned elsewhere within the room or residence where system 100 is located. In this regard, any suitable microphone 134 that is acoustically coupled with system 100 may be used to monitor sounds. Microphone 134 may be communicatively coupled (i.e., in operative communication) to controller 130.

As shown, controller 130 is communicatively coupled with user interface panel 126, controls 128, and display 132. Controller 130 may also be communicatively coupled with various operational components of cooktop appliance 104 as well, such as heating elements (e.g., 118, 124), sensors, etc. Input/output ("I/O") signals may be routed between controller 130 and the various operational components of cooktop appliance 104. Thus, controller 130 can selectively activate and operate these various components. Various components of cooktop appliance 104 are communicatively coupled with controller 130 via one or more communication lines such as, for example, conductive signal lines, shared communication busses, or wireless communications bands.

In some embodiments, controller 130 includes one or more memory devices and one or more processors. The processors can be any combination of general or special purpose processors, CPUs, or the like that can execute programming instructions or control code associated with operation of cooktop appliance 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 130 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 130 includes a network interface such that controller 130 can connect to and communicate over one or more networks with one or more network nodes. Controller 130 can also include one or more transmitting, receiving, or transceiving components for transmitting/receiving communications with other devices communicatively coupled with cooktop appliance 104. Additionally, or alternatively, one or more transmitting, receiving, or transceiving components can be located off board controller 130. Generally, controller 130 can be positioned in any suitable location throughout cooktop appliance 104. For example, controller 130 may be located proximate user interface panel 126 toward front portion of cooktop appliance 104. In optional embodiments, controller 130 is in operable communication with a controller 130 (described below) of microwave appliance 102 (e.g., through one or more wired or wireless channels). Additionally or alternatively, controller 130 may include at least one processor capable of performing instructions. For instance, a memory of controller 130 may include at least one tangible non-transitory computer-readable medium that stores instructions that cause the processor to perform certain operations.

As noted above, microwave appliance 102 may be positioned or mounted above cooktop appliance 104 (e.g., as an OTR microwave). Specifically, an insulated cabinet 150 of microwave appliance 102 may be positioned above cooktop appliance 104 along the vertical direction V. As shown, cabinet 150 of microwave appliance 102 includes a plurality of outer walls and when assembled, microwave appliance 102 generally extends along the vertical direction V between a top end 152 and a bottom end 154; along the lateral direction L between a first side end 156 and a second side end 158; and along the transverse direction T between a front end 160 and a rear end 162. In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150. Within cabinet 150, an internal liner of cabinet 150 defines a cooking chamber 166 for receipt of food items for cooking.

Microwave appliance 102 is generally configured to heat articles (e.g., food or beverages) within cooking chamber 166 using electromagnetic radiation. Microwave appliance 102 may include various components which operate to produce the electromagnetic radiation, as is generally understood. For example, microwave appliance 102 may include a heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 166.

The structure and intended function of microwave ovens or appliances are generally understood by those of ordinary skill in the art and are not described in further detail herein. According to alternative embodiments, microwave appliance 102 may include one or more heating elements, such as electric resistance heating elements, gas burners, other microwave heating elements, halogen heating elements, or suitable combinations thereof, are positioned within cooking chamber 166 for heating cooking chamber 166 and food items positioned therein.

Figure 3:
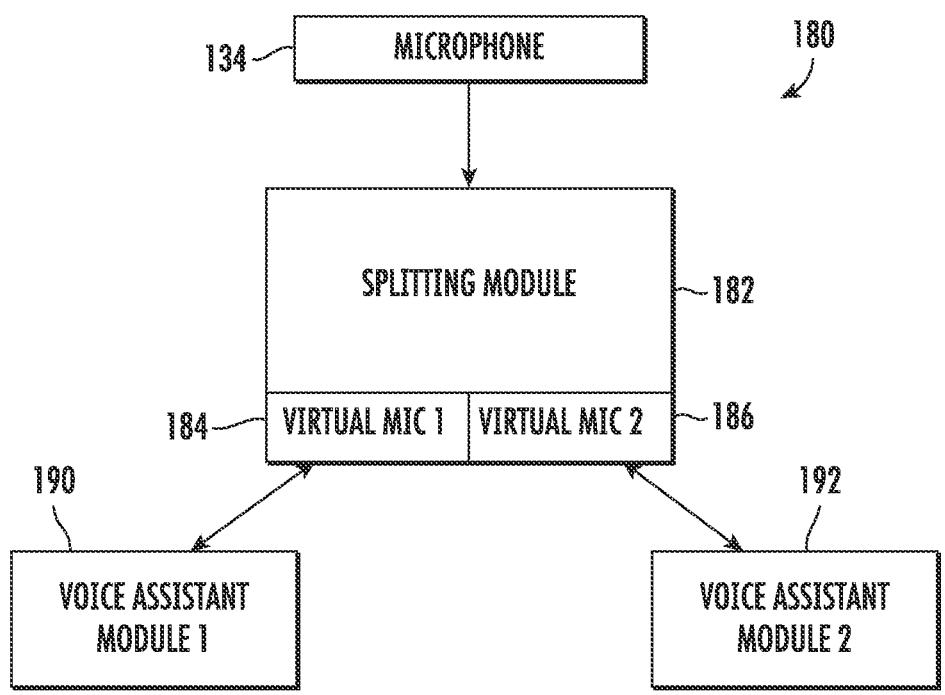
FIG. 3 provides a schematic view illustrating a potential connection of an exemplary system according to exemplary embodiments of the present disclosure.

Referring to FIG. 3, a schematic diagram of a voice activation system according to an exemplary embodiment is illustrated. System 100 may include a voice assistant activation system 180. Voice assistant activation system 180 may be installed into controller 130. In some embodiments, voice assistant activation system 180 is provided on or in an exterior storage unit that is in network communication with controller 130. Voice assistant activation system 180 may be used to incorporate and run two or more voice assistant modules within system 100 while utilizing a single microphone. Advantageously, voice assistant activation system 180 allows for a more streamlined operation of multiple voice assistant modules while reducing operating and hardware costs.

In detail, voice assistant activation system 180 includes microphone 134. Voice activation system 180 may further include a splitting module (or signal processing module) 182. Splitting module 182 may receive the voice input or signal from microphone 134 and split the voice input or signal into two identical signals. Each signal may contain the same information (i.e., the voice input or signal is copied). In detail, splitting module 182 may perform sound processing on the received voice input or signal to produce the two identical signals. In some embodiments, splitting module 182 splits the voice input or signal into three or more identical signals. Accordingly, any suitable number of identical signals may be produced by splitting module 182.

Splitting module 182 may transmit the produced identical signals to virtual microphones. For example, voice activation system 180 may include a first virtual microphone 184 and a second virtual microphone 186. In some embodiments, first virtual microphone 184 and second virtual microphone 186 are integral with splitting module 182. Additionally or alternatively, first virtual microphone 184 and second virtual microphone 186 may be separate entities from splitting module 182. In other words, first virtual microphone 184 and second virtual microphone 186 may be housed or incorporated separately from splitting module 182 (e.g., in controller 130, for example). In detail, first virtual microphone 184 and second virtual microphone 186 may mimic or emulate a microphone interface allowing another software program to communicate with the microphone. Advantageously, this allows more than one software program to connect with, communicate with, and receive signals from a single microphone (e.g., microphone 134).

First virtual microphone 184 may be a first interface that is communicatively coupled to each of the microphone 134 and either a first voice assistant module 190 or a second voice assistant module 192, which will be explained below. For example, first virtual microphone 184 may receive a signal corresponding to a voice input received by microphone 134. In some embodiments, first virtual microphone 184 is a first virtual interface receiving and distributing a mirrored or duplicated output of microphone 134. In other words, first virtual microphone 184 may be a separate and distinct output from splitting module 182. First virtual microphone 184 may then communicate the signal to either first voice assistant module 190 or second voice assistant module 192. Accordingly, first voice assistant module 190 has constant access to first virtual microphone 184 and thus constant access to microphone 134.

Second virtual microphone 186 may be a second interface that is communicatively coupled to each of the microphone 134 and either the first voice assistant module 190 or the second voice assistant module 192, which will be explained below. For example, second virtual microphone 186 may receive a signal corresponding to a voice input received by microphone 134. In some embodiments, second virtual microphone 186 is a second virtual interface receiving and distributing a mirrored or duplicated output of microphone 134. In other words, second virtual microphone 186 may be a separate and distinct output from splitting module 182. Second virtual microphone 186 may then communicate the signal to either first voice assistant module 190 or second voice assistant module 192. Accordingly, second voice assistant module 192 has constant access to second virtual microphone 184 and thus constant access to microphone 134. Advantageously, each of first voice assistant module 190 and second voice assistant module 192 has constant access to microphone 134, allowing each of first voice assistant module 190 and second voice assistant module 192 to receive and analyze signals corresponding to voice inputs from microphone 134.

Although the splitting module 182 is described as transmitting signals to virtual microphones, it should be appreciated that splitting module 182 may provide the split signals to the voice assistant modules in any other suitable manner. In this regard, for example, virtual microphones 184, 186 may simply be output nodes or connections where the voice assistant modules may be coupled to "hear" the duplicated signal. This paragraph could use some cleaning up and clarification, but need to ensure we have a genericized description of the operation of these "virtual mics"

First voice assistant module 190 and second voice assistant module 192 may be artificial intelligence (AI) software components providing voice activated assistance to users. For instance, each of first voice assistant module 190 and second voice assistant module 192 may be network connected algorithms capable of communicating with multiple other network connected appliances within a household. Accordingly, first voice assistant module 190 and second voice assistant module 192 may be software programs implemented by a controller (e.g., controller 130). Additionally or alternatively, each of first voice assistant module 190 and second voice assistant module 192 may be connected through the Internet to retrieve and present information and/or multimedia (e.g., music, video, etc.). Each of first voice assistant module 190 and second voice assistant module 192 may utilize artificial intelligence, neural networks, machine learning, or deep learning algorithms that are speaker dependent. Accordingly, each of first voice assistant module 190 and second voice assistant module 192 may be trained to recognize a keyword (e.g., a first keyword for first voice assistant module 190 and a second keyword for second voice assistant module 192) and initiate activation and interaction upon recognizing the keyword. Thus, first voice assistant module 190 and second voice assistant module 192 may be different from each other (i.e., different coding, different software design, etc.).

Figure 4:
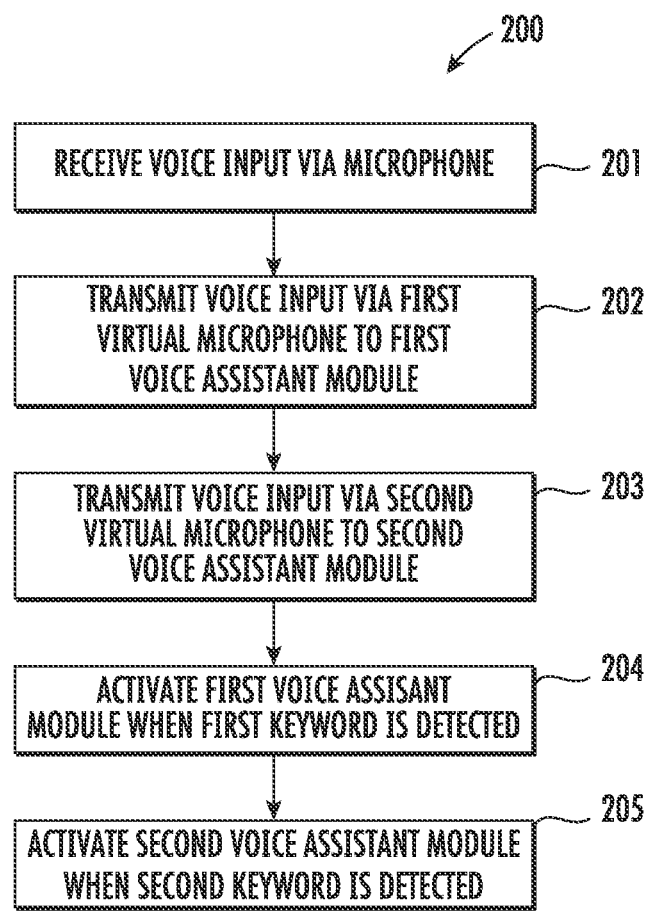
FIG. 4 provided a flow chart illustrating a method of operating a voice activation system according to an exemplary embodiment.

FIG. 4 is a flow chart illustrating a method of operating a voice assistant activation system according to an exemplary embodiment. A method 200 of operating a voice assistant activation system may be implemented into the above described system. It should be noted that method 200 may be implemented in any suitable appliance, particularly kitchen appliances, such as refrigerators, microwaves, ovens, dishwashers, washing machines, and the like. Accordingly, the implementation of method 200 is not limited to the system described above.

At step 201, the method may include receiving a voice input via a microphone (e.g., microphone 134). For instance, the microphone may be provided in an appliance, such as system 100. The microphone may be in a constant stand-by state, in that utterances are perpetually received by the microphone. The microphone may be in communication with a controller via a microphone input, for instance. Additionally or alternatively, the microphone may be in communication with a splitting module (e.g., splitting module 182). Thus, the voice input may be transmitted to the controller (or the splitting module). The microphone input may be a module that allows a voice assistant module to communicate with the microphone. In detail, the voice assistant module receives the voice input signal from the microphone by connecting to the microphone via the microphone input.

At step 202, the method may include transmitting the voice input to a first voice assistant module via a first virtual microphone. In detail, the microphone input may include a first virtual microphone and a second virtual microphone (e.g., first virtual microphone 184 and second virtual microphone 186). Each of the first virtual microphone and second virtual microphone may be duplicated virtual interfaces designed to allow more than one module (e.g., first voice assistant module 190 and second voice assistant module 192) to communicate with the microphone simultaneously (i.e., receive duplicate signals from the microphone). Accordingly, the controller may transmit the voice input or signal to one or more voice assistant modules.

At step 203, the method may include transmitting the voice input to a second voice assistant module via a second virtual microphone. As mentioned above, the microphone input may include the first virtual microphone and the second virtual microphone. Each of the first virtual microphone and second virtual microphone may be duplicated virtual interfaces designed to allow more than one module (e.g., first voice assistant module 190 and second voice assistant module 192) to communicate with the microphone simultaneously (i.e., receive duplicate signals from the microphone). Accordingly, the controller may transmit the voice input or signal to the one or more voice assistant modules. Further, by utilizing the first virtual microphone and the second virtual microphone (or any suitable number of virtual microphones), the first voice assistant module and the second voice assistant module may simultaneously receive the voice input from the microphone. For instance, the voice input may be converted to a signal (e.g., a digital signal) by the splitting module. The signal may then be duplicated and transmitted to each virtual microphone.

In some embodiments, the first virtual microphone and the second virtual microphone are incorporated as part of a splitting module (e.g., splitting module 182) that communicates between the microphone and each of the first voice assistant module and the second voice assistant module. In this case, the voice input is transmitted from the microphone to the splitting module. The splitting module then distributes the voice input (i.e., as a signal) to each voice assistant module via each of the first virtual microphone and the second virtual microphone. Accordingly, voice inputs (and corresponding signals) may be received by each voice assistant module that communicates with the splitting module via a virtual microphone.

At step 204, the method may include activating the first voice assistant module when a first keyword is detected. After the voice input is transmitted, each of the first voice assistant module and the second voice assistant module may analyze the voice input (or corresponding signal) and extract a keyword. Each of the first voice assistant module and the second voice assistant module may be activated by a different unique keyword. When the first keyword is uttered by a user and the voice input containing the first keyword is received and recognized by the first voice assistant module, the first voice assistant module may activate. In other words, the first voice assistant module may take full control of the microphone and continue listening to subsequent voice inputs from the user. In detail, the splitting module may cease distribution of any voice inputs received by the microphone to the second voice assistant module. Such subsequent voice inputs may include commands or requests (e.g., requesting details on the weather or stored appointments in a user's connected device, commands to activate a connected appliance or program, etc.). Additionally or alternatively, the first voice assistant module may receive and act on the command or request while the second voice assistant module remains inactive. Thus, only the first voice assistant module will receive the subsequent voice inputs until the command or request is fulfilled.

At step 205, the method may include activating the second voice assistant module when the second keyword is detected. As mentioned above, after the voice input is transmitted, each of the first voice assistant module and the second voice assistant module may analyze the voice input (or corresponding signal) and extract or identify a keyword. Each of the first voice assistant module and the second voice assistant module may be activated by a different unique keyword. When the second keyword is uttered by a user and the voice input containing the second keyword is received and recognized by the second voice assistant module, the second voice assistant module may activate. In other words, the second voice assistant module may take full control of the microphone and continue listening to subsequent voice inputs from the user. Such subsequent voice inputs may include commands or requests (e.g., requesting details on the weather or stored appointments in a user's connected device, commands to activate a connected appliance or program, etc.).

According to at least one embodiment, when the first voice assistant module receives and recognizes the first keyword and subsequently takes over control of the microphone, second voice assistant module is deactivated. For instance, the controller may recognize that the first voice assistant module has recognized the first keyword and restrict or prohibit the second voice assistant module from having access to the microphone. Thus, first voice assistant module may assume full control of the microphone while second voice assistant module is restricted from further receiving inputs from the microphone or one of the virtual microphones. In detail, the splitting module may cease distribution of any voice inputs received by the microphone to the second voice assistant module. Additionally or alternatively, the first voice assistant module may receive and act on the command or request while the second voice assistant module remains inactive. Similarly, when the second voice assistant module receives and recognizes the second keyword and subsequently takes over control of the microphone, first voice assistant module is deactivated. For instance, the controller may recognize that the second voice assistant module has recognized the second keyword and restrict first voice assistant module from having access to the microphone. Thus, second voice assistant module may assume full control of the microphone while first voice assistant module is restricted from further receiving inputs from the microphone or one of the virtual microphones. In detail, the splitting module may cease distribution of any voice inputs received by the microphone to the first voice assistant module. Additionally or alternatively, the second voice assistant module may receive and act on the command or request while the first voice assistant module remains inactive.

Additionally or alternatively, the controller may reactivate the disabled voice assistant module (e.g., first voice assistant module or second voice assistant module) after the command or request is carried out by the activated voice assistant module. For example, when the first voice assistant module recognizes the first keyword, the controller activates the first voice assistant module and deactivates the second voice assistant module. The first voice assistant module then listens to, analyzes, and carries out the command or request from the user. After the first voice assistant module is finished performing or carrying out the command or request, the controller reactivates the second voice assistant module and allows the second voice assistant module to have access to the microphone via the first or second virtual microphone.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a voice assistant activation system, the voice assistant activation system comprising a microphone, a first voice assistant module, and a second voice assistant module, the method comprising:
   receiving, via the microphone, a voice input;
   transmitting the voice input via a first virtual microphone to the first voice assistant module;
   transmitting the voice input via a second virtual microphone to the second voice assistant module, wherein the microphone simultaneously sends the voice input to both the first virtual microphone and the second virtual microphone;
   activating the first voice assistant module when the voice input comprises a first keyword;
   deactivating the second voice assistant module upon extracting the first keyword by restricting the second voice assistant module from further receiving the voice input from the second virtual microphone;
   activating the second voice assistant module when the voice input comprises a second keyword; and
   deactivating the first voice assistant module upon extracting the second keyword by restricting the first voice assistant module from further receiving the voice input from the first virtual microphone.

2. The method of claim 1, wherein the first and second voice assistant modules are software programs implemented by a controller of an appliance, and wherein the first virtual microphone and the second virtual microphone are software programs designed to receive the voice input from the microphone and transmit the voice input to each of the first and second voice assistant modules.

3. The method of claim 1, wherein the first voice assistant module is different from the second voice assistant module.

4. The method of claim 1, wherein the first virtual microphone comprises a first virtual interface receiving and distributing a duplicated output of the microphone and the second virtual microphone comprises a second virtual interface receiving and distributing a duplicated output of the microphone.

5. The method of claim 1, wherein the first voice assistant module and the second voice assistant module each communicate with the first virtual microphone and the second virtual microphone.

6. The method of claim 1, wherein the first keyword is different from the second keyword.

7. The method of claim 1, wherein the computer implemented operating system is provided in a home appliance.

8. A computing system comprising:
- at least one processor;
- a microphone in communication with the at least one processor;
- a first voice assistant module connected to the at least one processor;
- a second voice assistant module connected to the at least one processor;
- a splitting module in communication with the microphone and each of the first and second voice assistant modules; and
- at least one tangible, non-transitory computer-readable medium that stores instructions that, when executed by the at least one processor, cause the at least one processor to perform operations, the operations comprising:
  - receiving, via the microphone, a voice input;
  - splitting, via the splitting module, the voice input into a plurality of voice input copies, each of the plurality of voice input copies being identical to the voice input;
  - transmitting a first voice input copy of the plurality of voice input copies via a first virtual microphone to the first voice assistant module;
  - transmitting a second voice input copy of the plurality of voice input copies via a second virtual microphone to the second voice assistant module;
  - activating the first voice assistant module when the voice input comprises a first keyword;
  - restricting, via the splitting module, the second voice assistant module from further receiving the voice input from the second virtual microphone upon extracting the first keyword;
  - activating the second voice assistant module when the voice input comprises a second keyword; and
  - restricting, via the splitting module, the first voice assistant module from further receiving the voice input from the first virtual microphone upon extracting the second keyword.

9. The computing system of claim 8, wherein the first and second voice assistant modules are software programs implemented by a controller of an appliance, and wherein the first virtual microphone and the second virtual microphone are software programs designed to receive the voice input from the microphone and transmit the voice input to each of the first and second voice assistant modules.

10. The computing system of claim 8, wherein the first voice assistant module is different from the second voice assistant module.

11. The computing system of claim 8, wherein the microphone simultaneously sends the voice input to both the first virtual microphone and the second virtual microphone.

12. The computing system of claim 8, wherein the first virtual microphone comprises a first virtual interface receiving and distributing a duplicated output of the microphone and the second virtual microphone comprises a second virtual interface receiving and distributing a duplicated output of the microphone.

13. The computing system of claim 8, wherein the first voice assistant module and the second voice assistant module each communicate with the first virtual microphone and the second virtual microphone.

14. The computing system of claim 8, further comprising deactivating the second voice assistant module upon extracting the first keyword.

15. The computing system of claim 8, further comprising deactivating the first voice assistant module upon extracting the second keyword.

16. The computing system of claim 8, wherein the first keyword is different from the second keyword.

17. The computing system of claim 8, wherein the computer implemented operating system is provided in a home appliance.

* * * * *